Jan. 7, 1964 N. C. SETHNE 3,116,643
APPARATUS FOR PLANE SEPARATION AND CALIBRATION IN BALANCING MACHINES
Filed March 21, 1960
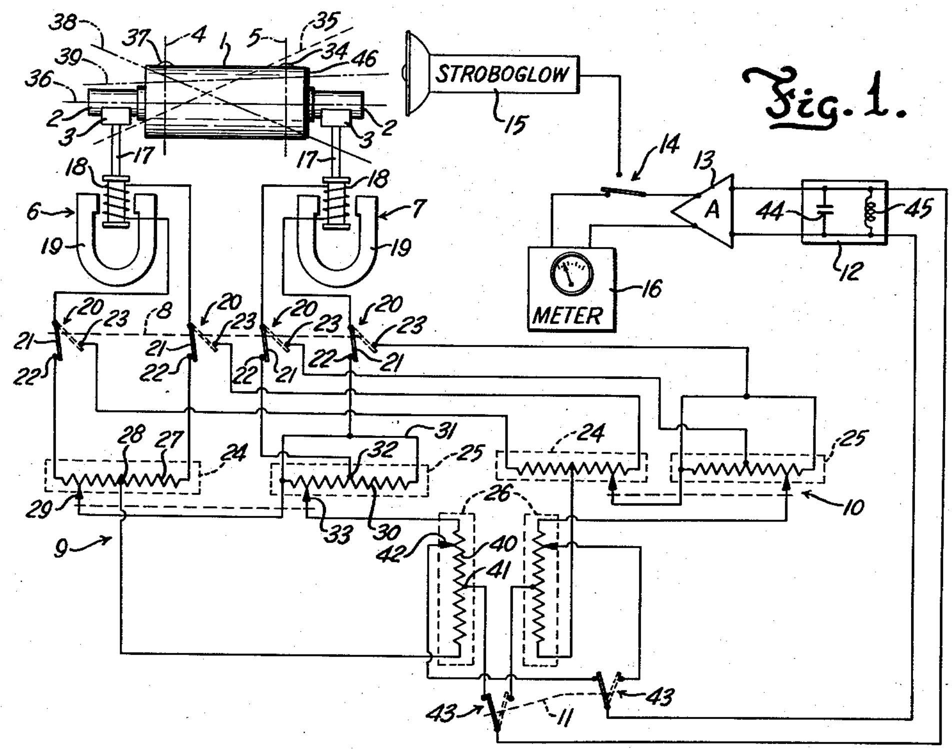
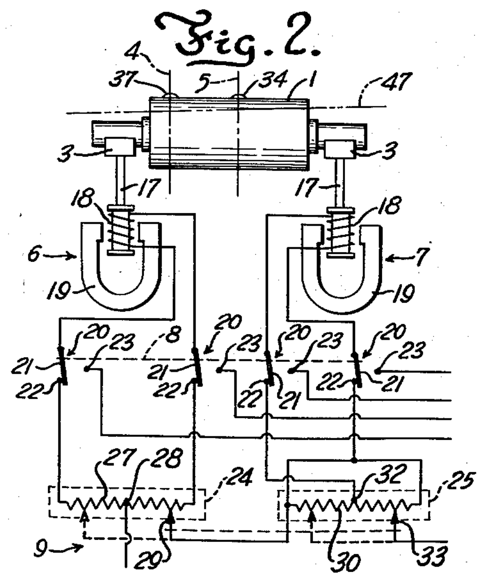
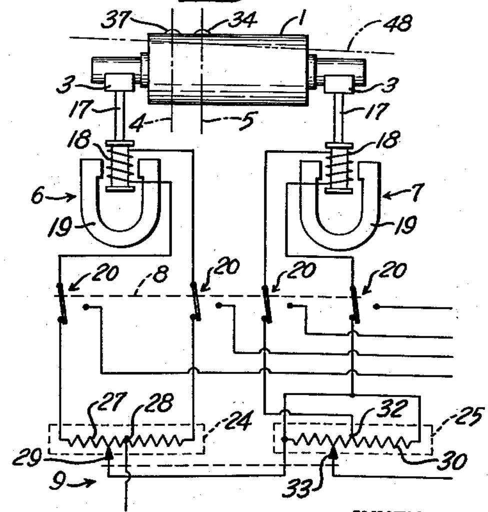
INVENTOR.
Norman C. Sethne
BY
Andrus & Starke
Attorneys

United States Patent Office 3,116,643
Patented Jan. 7, 1964

1

3,116,643

APPARATUS FOR PLANE SEPARATION AND CALIBRATION IN BALANCING MACHINES

Norman C. Sethne, Madison, Wis., assignor to Gisholt Machine Company, Madison, Wis., a corporation of Wisconsin Filed Mar. 21, 1960, Ser. No. 16,462
6 Claims. (Cl. 73—466)

This invention relates to apparatus for correction plane separation and calibration in a balancing machine for determining necessary mass correction in arbitrarily selected transverse planes through the member being balanced to permit static and dynamic balancing of the rotating member.

Rotating members such as rotors should be statically and dynamically balanced for satisfactory operation. A standard method of balancing includes determining coordinately directed unbalance components in each of two planes of correction which extend perpendicular to the rotational axis. Mass corrections of the proper amount and at the proper angular position are then made in each of the correction planes. In analyzing the rotor unbalance in each of the correction planes, the effect of any unbalance in the opposite plane must be effectively removed.

An unbalance force in a suitably mounted rotating member displaces the principal inertia axis from the bearing axis. For any given correction plane, an intersection between the bearing axis and the principal inertia axis exists and constitutes a nodal point at which no displacement arises due to an unbalance force in that plane. The displacement on opposite sides of the nodal point is directly proportional to the unbalance force and consequently increases and decreases with the amplitude of the unbalance force. The ratio of the displacements of the principal inertia axis from the bearing axis for any given corresponding location on the opposite sides of the nodal point is, however, constant regardless of the amount of unbalance in the selected correction plane.

Highly satisfactory balancing machines are known which employ this constant ratio to establish plane separation. Generally, the rotating member is carried by a seismic mounting to freely support the rotating member in two spaced bearings for unrestrained movement in a given sensing plane, normally the horizontal plane. As the member rotates in the bearings, the unbalance forces cause displacement in the horizontal plane and this displacement is proportional to the amount of unbalance and in synchronism with the rotational frequency of the rotating member. Electromagnetic pickups or the like are coupled to the bearings and constitute alternating current (A.C.) generators establishing a generally sinusoidal A.C. signal having an amplitude which is directly proportional to the amount of unbalance at the corresponding planes and a frequency which is in phase with the rotation of the unbalance force. By suitable comparison of the voltages with a synchronized and properly phased reference signal, the amount and angle of unbalance in one of the correction planes can be determined.

Normally, to isolate the unbalance in one of the planes, the voltage signals are inserted through a voltage summation circuit including a circuit proportioning means which eliminates the effect of unbalance in the opposite plane. Because the displacement for any given amplitude varies

2 in direct proportion to the original ratio of the signals, the summation of resulting voltages due to unbalance in the one plane is always equal to zero in the voltage summation circuit if the voltages are properly phased. However, an unbalanced force in any other preselected correction plane creates a net voltage signal which is proportional to the amount of unbalance. The latter signal is employed to determine the necessary mass correction to balance the member in the preselected correction plane.

Separate channels or circuits are provided for analyzing the correction in the two planes. The second channel is set to reject the effect of unbalanced forces in the first plane and to only respond to the unbalance force in the second plane.

Depending upon the selection of the correction planes and the location of the pickups with respect to the center of gravity of the object being balanced, the voltages established in similarly constructed generating and summation circuits vary in polarity. The previous discussion assumed that one of the voltage signals was negative with respect to the others such that the summation could be reduced to zero. However, the voltages may, in fact, both be positive with the circuit described and could not be balanced out. Prior art structures normally provide reversing switches in each of the pickup connections to allow reversing of the polarity of either one of the voltage signals. In this manner, a positive signal and a relatively negative signal are impressed upon the voltage summation circuit to cancel the effect of unbalance in the one plane.

A third condition of unbalance encountered establishes a larger voltage across the fixed voltage element in the voltage summation unit. The smaller voltage across the proportioning unit would therefore never permit establishment of a sufficiently large cancelling voltage to reduce the unit to zero. Present practice provides switches to reverse the connection of the fixed voltage unit and the proportioning voltage unit to the generating pickups and thereby reverse the position of the voltage drop to allow the necessary proportioning of the circuit.

In prior art structures, individual calibrating devices are also selectively connected in the circuit by separate switches for calibrating the readings for the planes of correction.

Although the use of switches provides a completely satisfactorily functioning balancing unit, additional components are added in the balancing unit which increase the material costs and the time of assembling. Further, in operating the balancing unit, the several individually set switches in each of the channels must be set correctly to properly condition the circuit.

The present invention is particularly directed to a circuit for plane separation for all relative locations of the correction planes and pickups with respect to the center of gravity without the necessity of the normal switching means.

In accordance with the present invention, as in prior art, pickup means are associated with the member being balanced to establish A.C. voltage signals or the like in accordance with the unbalance forces in preselected planes. In carrying out the invention, the first signal is connected to a voltage divider or the like having a center tap connection and a movable connection or wiper constituting the output terminals of the voltage divider. The center tap connection constitutes a reference zero with a relatively positive signal range on one side of the reference point and a relatively negative signal range on the opposite side of the reference point. Consequently, correspondingly positively or negatively phased A.C. signals can be established on the movable connection or wiper.

The second voltage signal is connected to a second voltage divider or the like to establish an adjustable voltage signal in series with the wiper and the center tap connection of the first voltage divider. With this series output circuit, ratios of the two voltage signals can be established to eliminate the effect of the unbalance in one of the planes of correction for all possible conditions encountered.

The two voltage dividers constitute a plane separating circuit which restricts the signal output to the unbalance in one of the two preselected planes. A similar pair of voltage dividers is provided to form a second plane separating circuit having a signal output restricted to the second of the two preselected planes.

In accordance with another aspect of the present invention, the second voltage divider is constructed in a manner corresponding to the first voltage divider with a center tap connection. The opposite ends of the second voltage divider are connected in common to one end of the second pickup and the center tap connection is connected to the opposite end of the second pickup. A movable wiper and the common connected ends constitute the output terminals of the second divider. The outputs of the two voltage dividers are connected in series circuit. The movable wipers of the first and second voltage dividers are ganged for simultaneous and similar movement and positioning. The wipers can be positioned to establish a relatively zero or null signal regardless of the amplitude or phase of the output of either pickup. Consequently, only a single control is necessary to establish a null or zero reading and the operation of the balancing machine is simplified.

In accordance with still another aspect of the present invention, a center tapped calibrating voltage divider is connected across the output of the series summation circuit.

The output of the calibrating voltage divider is connected by the center tap and a movable connection or wiper to the detection unit. The calibrating voltage divider allows the balancing machine to be continuously adjusted to read directly in practical units such as the depth of a hole to be drilled in the member at the correction plane or the number of unit weights to be added, in accordance with standard practice. The center tap construction, however, of the present invention establishes for any given unbalance a positive or a negative signal which indicates the heavy or light side of the unbalance force in a given correction plane. The movable tap is set on one side or the other of the center tap to create a signal to indicate the heavy or light side depending upon whether correction is to be made by the removal of the addition of matter to balance the rotating member. The center tapped calibration voltage divider may also be employed in other conventional single and multiplane correction apparatus to indicate the heavy and light correction locations.

The present invention can also be employed for the conventional force and moment balancing of a rotating member. A single force correction plane is selected in which correction is to be made for force balancing. A pair of axially spaced moment correction planes are then selected in each of which equal correction is made precisely 180 degrees apart. One of the plane separating circuits is preset to restrict the output signal to the force unbalance in the force correction plane and the other plane separating circuit is preset to restrict the output signal to the moment unbalance in the pair of moment correction planes.

The present invention thus provides, by the simple and novel connection of voltage dividing means or the like, complete plane separation and calibration without the conventional switching means by simultaneously establishing signal ranges of proper phasing in accordance with unbalance created effects in the rotating body. This is particularly important in providing a very easily understood and executed procedure for balancing which can be readily introduced to balancing operators having limited experience, skill or mechanical aptitude.

The drawing furnished herewith illustrates the best mode presently contemplated for carrying out the invention.

In the drawing:

FIG. 1 is a diagrammatic illustration of a rotor mounted within a pickup unit in combination with a schematic circuit diagram of a balancing circuit including plane separation in accordance with the present invention;

FIG. 2 is a diagrammatic illustration of a rotor and a portion of the plane separation circuit of FIG. 1 illustrating a second possible condition encountered in balancing; and FIG. 3 is an illustration similar to FIG. 2 for the third condition encountered in balancing of rotating members.

Referring to the drawing and particularly to FIG. 1, cylindrical rotor 1 is illustrated having axially extending bearing journals 2 rotatably mounted within bearings 3. In accordance with standard practice, the bearings 3 are flexibly mounted to allow free movement in at least one plane through the bearing axis of rotor 1 in accordance with unbalance forces in the rotor 1. A left correction plane 4 and a right correction plane 5 are arbitrarily selected within which material can be conveniently added or removed to eliminate the unbalance of the rotor 1. A left pickup 6 is mounted adjacent the left bearing 3 and a right pickup 7 is mounted adjacent the right bearing 3 to establish output voltages in proportion to the displacements caused by the unbalance of rotor 1. A switch bank 8 selectively connects the output of the left and right pickups 6 and 7 to a left plane separating circuit 9 or a right plane separating circuit 10.

The circuits 9 and 10 are constructed, as subsequently described, to allow manipulation of the input signals from pickups 6 and 7 to reject the effects of the unbalance in the opposite correction plane. Therefore, the effect of the unbalance in the corresponding plane of rotor 1 is the only unbalance force which creates an output signal from the corresponding separation circuits 9 and 10.

A switch bank 11 selectively connects the output of the separation circuits 9 and 10 to a filter 12 which is adapted to remove all extraneous signals which may have arisen in the pickups and the like. An amplifier 13 is connected to the output of the filter 12 to increase the level of the signal to a useful level. An angle-amount switch 14 connects the amplified signal from amplifier 13 to a stroboglow 15 for indicating the angle of mass correction and to a meter 16 for indicating the amount of mass correction to be added or removed to balance the rotor 1.

The illustrated cylindrical rotor 1 may, of course, have any practical configuration. A cylinder is selected for purposes of clarity and simplicity of illustration and explanation.

The correction planes 4 and 5 are selected in accordance with well-known practice to provide for the simplest and quickest correction in any well-known manner.

The rotor 1 is rotated within bearings 3 in any suitable manner, not shown, such as by a belt drive encircling and engaging the periphery of the rotor, a separate end drive, a self drive or the like.

During the rotation of the rotor 1, the unbalance in the rotor 1 causes displacement of the journals 2 and the flexibly mounted bearings 3.

As previously noted, the bearings 3 are normally mounted for free movement in a horizontal pickup plane. In the illustrated embodiment of the invention, however, the detection of the displacement by pickups 6 and 7 is shown in a vertical plane for simplicity of illustration.

Each of the pickups 6 and 7 is diagrammatically illustrated as an electro-mechanical transducer including an armature 17 which extends into coupled relation with the bearings 3 for displacement in accordance with the unbalance generated displacement of the bearings 3. A coil 18 is carried by the armature 17 between the poles of a suitable magnet 19. The unbalance generated displacement of the bearings 3 moves the coil 18 within the magnetic field between the poles of magnet 19 and establishes an output voltage across the coil 18. In accordance with standard action, this voltage is directly proportional to the amplitude of the displacement.

The output of the coil 18 is connected selectively by the switch bank 8 to the left or right plane separating circuits 9 and 10.

The switch bank 8 consists of four single-pole, double-throw switches 20 connected one in each of the output lines from coils 18. Each switch 20 includes a pole 21 connected to the corresponding coil end and a left plane contact 22 and a right plane contact 23 connected to input lines to the respective plane separating circuits 9 and 10. The poles 21 are ganged for simultaneous actuation such that only a single actuator or control level is necessary for circuit switching.

The left plane separating circuit 9 and the right plane separating circuit 10 are structurally identical. Only the left plane separating circuit 9 is subsequently described in detail. Corresponding elements in the circuit 10 carry corresponding numbers for purposes of identifying the several elements in the circuit.

Referring particularly to the left portion of FIG. 1, the plane separating circuit 9 generally includes a pair of similar potentiometers 24 and 25 having inputs connected respectively to the left and right pickups 6 and 7 through switch bank 8. The outputs of potentiometers 24 and 25 are connected in a series voltage summation circuit to establish a net voltage corresponding to a force unbalance as more fully described hereinafter. A calibrating potentiometer 26 is connected across the series summation circuit and interconnects the output of the potentiometers 24 and 25 to the filter 12 by suitable actuation of the switch bank 11.

The potentiometer 24 includes a resistance element 27 having the opposite ends connected to the left plane contacts 22 of the switches 20 and, therefore, to the opposite ends of coil 18 of pickup 6 with the switch poles 21 in the full line position shown in FIG. 1. The voltage signal which appears across the coil 18 of pickup 6 thus appears across the resistance element 27. A center tap 28 is connected to the electrical and physical center of the resistance element 27 and constitutes a neutral or zero reference output terminal of the potentiometer 24. A movable connection or wiper 29 is slidably associated with the resistance element 27 in the usual manner to allow continuous selective positioning of the wiper 29 on the resistance element 27 on either side of the tap 28. The movable wiper 29 constitutes the second output terminal for the potentiometer 24 and allows establishment of a negatively or positively phased signal with respect to the neutral or zero reference center tap 28.

The potentiometer 25 similarly includes a resistance element 30 which corresponds in construction to the resistance element 27. A jumper line 31 connects the opposite ends of the resistance element 30 together and is connected to the left plane contact 22 of a switch 20 in switch bank 8. The pole 21 of the corresponding switch 20 is connected to one side of coil 18 of the right pickup 7 with the switch bank 8 in the full line position. A permanent center tap 32 is provided on the resistance element 30 and constitutes a second input terminal to the potentiometer 25. The center tap 32 is connected by a switch 20 of switch bank 8 to the opposite side of the coil 18 of the right pickup 7. The voltage generated in coil 18 is therefore applied across two equal and parallel paths existing between the common jumper line 31 and the center tap 32 of potentiometer 25. Consequently, voltage drops, each equal to the generated voltage in coil 18 of pickup 7, exist between the center tap 32 and the ends of the resistance element 30. The ends of the element 30 constitute zero output positions for the potentiometer 25 and the center tap therefore is at the maximum voltage.

The jumper line 31 also constitutes an output terminal for the potentiometer 25 and is connected directly to the movable wiper 29 of potentiometer 24. A movable connection or wiper 33 is slidably associated with the resistance element 30 and constitutes the second output terminal. The wiper 33 permits selection of any desired voltage between the center tap 32 and jumper line 31. The voltage of movable wiper 33 for corresponding positioning on the opposite sides of center tap 32 is identical in amplitude and phase because of the parallel connection of the resistance element 30 with the coil 18 of pickup 7.

The series connection of the outputs of potentiometers 24 and 25 establishes an algebraic summation circuit consisting of wiper 33 of potentiometer 25, the portion of the resistance element 30 connected between wiper 33 and the jumper line 31 which is connected directly to the movable wiper 29 of the potentiometer 24 and the portion of the resistance element 27 between the wiper 29 and the center tap 28 of the potentiometer 24. The wipers 29 and 33 are ganged for similar and simultaneous movement and positioning on the respective resistance elements 27 and 30. The net signal of the summation circuit is employed to determine the angle and amount of unbalance.

An unbalance force is shown diagrammatically in the right correction plane 5 of FIG. 1 by a small mass 34. For the immediate discussion, it is assumed that no unbalance exists in the left correction plane 4 and that the only unbalance force acting is that noted by the mass 34. The mass 34 displaces a principal inertia axis 35 from the rotor bearing axis 36 in accordance with well-known theory. At the bearings 3, the displacement is in opposite directions and directly proportional to the amount of the unbalance mass 34. Assume for purposes of illustration that a voltage is generated in the respective coils 18 of the left and right-hand pickups 6 and 7 of a minus 200 microvolts and a plus 300 microvolts. The polarity is based on an arbitrary assignment of a positive polarity to an upward displacement of the bearings in FIG. 1 and a negative polarity to a downward displacement.

The minus 200 microvolts then appears across the resistance element 27 of potentiometer 24 and 100 microvolts is established between the center tap 28 and the opposite ends of the resistance element 27. The 300 microvolts of the coil 18 of the right-hand pickup 7, however, appears completely across each half of the resistance element 30 of the potentiometer 25 because of the parallel connection previously described. The center tap 32 of potentiometer 25 is therefore a plus 300 microvolts with respect to the ends of the resistance element 30.

By suitable positioning of the movable wipers 29 and 33, equal and opposite voltages will be inserted in the summation circuit. In the assumed illustration, the voltages are equal and opposite with the wipers 29 and 33 one-quarter of the distance from the left end of the resistance elements 27 and 30. The potentiometer 25 starts with wiper 33 at zero and in moving the one-quarter distance toward the center tap 32 increases to 75 microvolts. The potentiometer 24 starts with the movable wiper 29 at the left end of the element 27 which is at a maximum negatively phased 100 microvolts. By moving one-quarter of the distance toward the center tap 28, the potential of moveable wiper 29 is reduced to a minus 75 microvolts. Consequently, the minus 75 microvolts across the resistance element of potentiometer 24 algebraically is added to the positive 75 microvolts of the potentiometer 25 and establishes a net zero voltage or a null condition. Subsequently, regardless of the value of the unbalance mass 34 in the right correction plane 5, a null condition is established because the inverse of the constant ratio of displacement at the bearings 3 is set up in potentiometers 24 and 25 by the wipers 29 and 33.

However, an unbalance mass 37 in the left correction plane 4 establishes a positive output signal. The mass 37, in the absence of mass 34, establishes a principal inertia axis 38 which is offset with respect to the rotor bearing axis 36. The displacement at the respective bearings 3 is directly proportional to the amount of unbalance. Coil 18 of the left-hand pickup 6 generates a positive voltage, assumed to be 400 microvolts, and the coil 18 of the right-hand pickup 7 then generates a negative voltage, assumed to be 200 microvolts. The 400 microvolts appears across the resistance element 27 of potentiometer 24 with 200 microvolts between the center tap 28 and the opposite ends of the element 27. The negative 200 microvolts from pickup 7 appears between the center tap 32 of potentiometer 25 and the ends of the resistance element 30 because of the parallel connection. Wiper 29 is now at a positive 150 microvolts which is three-quarters of the 200 microvolts appearing between the center tap 28 and the outer corresponding end of the element 27 of potentiometer 24. Wiper 33 is at a minus 50 microvolts equal to the 200 microvolts appearing across the element divided by the one-quarter distance moved from the zero reference point. Consequently, a net 100 microvolts appears across the summation of the two outputs of potentiometers 24 and 25. This 100 microvolts is a signal which indicates the amount and the angle of unbalance.

The superposition of both unbalance masses 34 and 37 establishes direct algebraic addition of the displacements at the bearings 3 and a final principal inertia axis 39 is displaced accordingly from the rotor axis 36. The action of the potentiometers 24 and 25 remains unchanged and a net 100 microvolts appears across the summation of the potentiometers 24 and 25 and is impressed across the potentiometer 26.

Potentiometer 26 includes a resistive element 40 which is connected directly across the output of the potentiometers 24 and 25. A center tap 41 is provided and constitutes an output terminal of the potentiometer 26. A movable connection or wiper 42 is again provided and constitutes a second output terminal. The center tap 41 establishes a zero reference setting or point on the potentiometer resistive element 40 with oppositely phased voltages on opposite sides of the tap 41.

The movable wiper 42 is positioned to establish a preselected fraction of the voltage appearing between the center tap 41 and the end of the resistive element 40. The position of the movable wiper 42 is selected to calibrate the readings of meter 16 directly in units of mass correction such as the depth of the hole to be drilled or the number of unit weights to be added in the correction plane.

The positive and negative signals from potentiometer 26 establish the heavy and light side of the rotor. The potentiometer 26 is set to read the heavy or light side in accordance with the mode of mass correction to be used.

The switch bank 11 includes a pair of switches 43 similar to switches 20. The switches 43 are connected to the potentiometers 26 of circuits 9 and 10 to selectively connect the output of the respective potentiometers 26 to the input of the filter 12. Switches 43 of switch bank 11 may be ganged, as shown by the dotted connection line, with the switches 20 of switch bank 8 and one control member, not shown, provided in the balancing machine.

The illustrated filter 12 is of a conventional construction employed in balancing equipment and includes a capacitor 44 and an inductor 45 connected in a parallel circuit across the potentiometer 26. The filter 12 functions to remove undesirable extraneous signals superimposed upon the unbalance signal.

The amplifier 13 which is connected to the output of the filter 12 is also of any conventional and well-known construction. Amplifier 13 increases the signal to an operating level for direct operation of the meter 16 and the stroboglow 15 for indicating the amount and angle of unbalance depending upon location of switch 14 in the illustrated embodiment of the invention. By suitable design of the circuit connections, switch 14 can be removed and the meter 16 and stroboglow 15 connected directly to the amplifier 13.

The meter 16 gives a reading of the amplitude of the unbalance force in accordance with the setting of the calibrating potentiometer 26. The meter 16 is calibrated to read directly in correction units such as the depth of a hole to be drilled or the number of unit weights to be added.

The stroboglow 15 is actuated in the usual manner to establish a series of light pulses consisting of one pulse for each revolution of the rotating piece. The stroboglow 15 normally includes a signal squaring and pulsing circuit, not shown, to establish a series of pulses coincident with the zero crossover points of the unbalance signal. Alternate pulses are selected to trigger the stroboglow 15 and thereby establish a light pulse per revolution illuminating a point on the rotor 1 which appears as a stationary point on the rotor in accordance with conventional practice. An angle scale 46 is attached to an adjacent end face of the rotating rotor 1 to provide a visual reading of the proper angle for correction.

As previously noted, the calibrating potentiometer 26 allows selection of a positively or negatively phased output signal. Positively phased signals are employed, for example, to indicate the heavy point of the rotor. The light point or side of the rotor 1 is then indicated by a corresponding negatively phased signal. Whether the heavy or light side is to be located depends upon whether material is to be removed or added to the rotor.

With the switch banks 8 and 11 in the full-line position connecting the left plane separating circuit 9 to the filter 12, the operation of the balancing equipment is generally summarized as follows.

A balanced rotor 1 is mounted in bearings 3 and a known unbalance inserted in the right correction plane 5. In actual practice, an unbalanced rotor may be mounted in the bearings 3 and balanced by trial and error insertion of mass correction in each of the planes 4 and 5. For simplicity of explanation, a balanced rotor 1 is assumed. The potentiometer 26 is set to connect the series connected outputs of potentiometers 24 and 25 directly to filter 12 and the angle-amount switch 14 is set to connect the meter 16 in circuit.

The potentiometers 24 and 25 are then actuated to establish a zero reading on the meter 16.

When the null or zero reading on the meter 16 is obtained, the wipers 29 and 33 of potentiometers 24 and 25 are positioned to cancel out or reject the effects of the unbalance in the right correction plane 5. Thereafter, rotors similar to rotor 1 may be successively inserted in the bearings 3 and the unbalance in the left correction plane 4 analyzed.

With the balanced rotor 1 in bearings 3, an unbalance mass 37 is inserted in the left correction plane 4 and the rotor 1 is rotated in the usual manner. The unbalance force generates a voltage in pickups 6 and 7 which appears across the summation circuit formed by potentiometers 24 and 25 as previously described and appears on the meter 16. The calibrating potentiometer 26 is adjusted to establish a reading on the meter in accordance with the known unbalance mass 37 inserted in plane 4. All subsequent readings of an unbalance force in the left correction plane 4 are then directly in the desired units.

The angle-amount switch 14 is moved to the angle position connecting the output of the amplifier 13 to the stroboglow 15. If the stroboglow 15 indicates a reading on scale 46 corresponding to the position of the mass 37 added in the left correction plane 4 of rotor 1, the heavy spot or side of the rotor 1 is being indicated and unbalance correction requires removal of mass. If correction is to be made by addition of mass units to the rotor 1, the wiper 42 of potentiometer 26 is positioned on the opposite side of the center tap 41 and the illumination of scale 46 by the stroboglow 15 is shifted 180 degrees and therefore to the light spot or side of rotor 1.

The switch banks 8 and 11 are then moved to the dotted line position to connect the right plane separating circuit 10 to the pickups 6 and 7 and to filter 12. The same procedure as described above is followed to cancel out the effects of an unbalance force in the left correction plane 4 and to establish correct calibration of the meter readings.

The balancing machine is now set up to measure the proper amount of correction which is necessary in each of the two correction planes 4 and 5 to statically and dynamically balance other rotors generally similar to rotor 1.

Rotors to be balanced are mounted in the bearings 3 and driven at a predetermined speed. The switch banks 8 and 11, preferably by a single control arm, and the angle-amount switch 14 are positioned to locate the amount and angle of correction. After making the necessary correction, the rotor 1 can again be tested to assure that the correct correction has been made.

In FIG. 2 of the drawing, the rotor 1 is mounted in bearings 3 and a portion of the plane separating circuits 9 and 10 is again illustrated. The left correction plane 4 is similarly located. However, the right correction plane 5 is moved to the left and thus closer to the left correction plane 4. This illustrates generally a second possible condition encountered in rotating unbalanced parts.

The added mass 34 in the shifted right correction plane 5 establishes a principal inertia axis 47 displaced from the rotor bearing axis 36 generally as shown. This shift includes positive displacements at each of the two supporting bearings 3. Assuming the mass 34 establishes absolute displacements and voltages in the pickups 6 and 7 as previously described, the movable wipers 29 and 33 of potentiometers 24 and 25 are again positioned as in FIG. 1 as shown by the dotted wipers. The wipers are at a corresponding 75 microvolt level. However, both voltages are now positive and establish a 150 microvolt output. To establish a zero reading, the wipers of potentiometer 24 is correspondingly located on the opposite side of the center tap 28 upon element 27. The wiper 29 is then at a negative 75 microvolts which is added to the positive 75 microvolts of wiper 33 to establish the desired balancing of the signals from pickups 6 and 7.

The simultaneous reversal of the movable wipers 33 of potentiometer 25 does not in any way change the output voltage of this circuit because identical voltages appear on the opposite sides of center tap 32 of potentiometer 25, as previously described.

In operating the balancing machine, the necessity of reversing from one side to the other is indicated if the voltage reading increases as the wiper 29 is moved toward the center of element 27.

The circuit of FIG. 2 is otherwise the same as previously described with respect to FIG. 1.

Referring particularly to FIG. 3 in the drawing, the third possible unbalance condition encountered in balancing rotating parts is illustrated. The right correction plane 5 is moved still further toward the left correction plane 4. A principal inertia axis 48 is displaced from the rotor bearing axis 36 by the mass 34 in the shifted plane 5 in a manner generating a larger voltage in pickup 6 than in pickup 7. This is the reverse of the generated voltages in the conditions illustrated in FIG. 2.

In order to raidly balance out the signal, the movable wipers 29 and 33 are preferably positioned to engage the center taps 28 and 32. That is, potentiometer 24 is set at a relative zero potential position and potentiometer 25 at a maximum potential position. Then, by moving the wipers 29 and 33 in the correct direction, a null position is established.

Therefore, the present invention allows plane separation by direct manipulation of the potentiometers 24 and 25 without the necessity for any reversing switches to compensate for the several different polarities or phases of the generated signals in pickups 6 and 7.

Although potentiometer 25 is illustrated as a symmetrical center tapped unit establishing symmetrical voltages, a single potentiometer 25 corresponding to one-half of the illustrated potentiometer 25 can be employed. However, the wipers of the potentiometers 24 and 25 can not then be tied directly together as in the illustrated embodiment of the invention. The illustrated construction provides a very simple and ready means of obtaining plane separation through a single control.

Further, resistive potentiometers are described as the most practical devices presently available. However, other voltage dividing units which permit center tapping can be employed within the scope of the present invention.

The present invention is also adapted to make corrections for force and moment balancing, as previously discussed, in accordance with standard and well-known operations. The invention is equally applicable to three plane and other plane separation systems and as employed in the claims a "plurality" means two or more. The calibration aspect of this invention is also applicable to the usual single plane balancing apparatus wherein a single transducer and single correction plane are used to balance a member.

The illustrated pickups, filter, amount meter, angle indicator and similar standard units can be of any suitable or well known variety within the scope of the present invention. In particular any pickups or transducers can be employed which provide a signal proportional to an effect established in the rotating body by an unbalance in the rotating body. Thus, force responsive transducers wherein actual displacement sensing is practically nonexistent can be employed. In accordance with well-known balancing construction, a phase shifter or the like may also be employed in the pickup or unbalance signal transducer to maintain the correct phase relation of the unbalance signals established in the generating unit.

The present invention thus provides for plane separation by a simplified procedure and with a minimum number of components in the circuit.

Various modes of carrying out the invention are contemplated as being within the scope of the following claims particularly pointing out and distinctly claiming the subject matter which is regarded as the invention.

I claim:

1. In a plane separating circuit for individually determining the unbalance components in a plurality of correction planes of a rotating body by sensing unbalance effects in two axially spaced sensing planes, a pair of transducer means adapted to be coupled to the rotating body at the sensing planes and establishing a pair of electrical signals, first voltage dividing means connected to one of said transducer means to establish a voltage drop in accordance with the unbalance effect in one sensing plane, a center connection in said voltage dividing means constituting a first output connection and a movable connection in said voltage dividing means selectively positionable to opposite sides of said first output connection and constituting a second output connection, a second voltage dividing means connected to the other of said transducer means to establish a voltage drop in accordance with the unbalance effect in the second sensing plane, one end of the second voltage dividing means constituting both an input connection and an output connection, a movable connection in the second voltage dividing means constituting a second output connection, means interconnecting said movable connections to establish corresponding positioning on the respective voltage dividing means, and voltage summation means connected in series circuit with the outputs of said first and second voltage dividing means.

2. In a plane separating network having a pair of similar plane separating circuits for individually determining the unbalance components in a plurality of transverse planes of a rotating body by establishing two A.C. voltages in accordance with unbalance effects in two axially spaced sensing planes, each of said plane separating circuits including first voltage dividing means to establish a voltage drop in accordance with the unbalance effect in one sensing plane, a center connection to said voltage dividing means constituting an output connection, a movable connection in the voltage dividing means constituting a second output connection, a second voltage dividing means to establish a voltage drop in accordance with the unbalance effect in the second sensing plane, one end of the second voltage dividing means constituting an input connection and an output connection, a movable connection in said second voltage dividing means constituting a second output connection of the second voltage dividing means, the outputs of said first and second voltage dividing means being connected in a series summation circuit, means interconnecting said movable connections to establish corresponding positioning on the respective voltage dividing means, a calibrating voltage dividing means connected across the series summation circuit and having a center tap and a movable tap constituting output connections of the corresponding plane separating circuit, an angle-amount indicating circuit adapted to be connected to each of the plane separating circuits, and switch means to simultaneously and selectively connect the plane separating circuits to said A.C. voltages and to the angle-amount indicating circuit.

3. In a plane separating circuit for individually determining the unbalance components in a plurality of correction planes of a rotating body by sensing unbalance effects in two axially spaced sensing planes, a pair of transducer means adapted to be coupled to the body and establish a pair of electrical signals in accordance with the unbalance effect in the respective sensing planes, first voltage dividing means connected across one transducer means, in one sensing plane, a center connection in said voltage dividing means constituting a first output connection and a movable connection in said voltage dividing means constituting a second output connection, a second voltage dividing means structurally corresponding to said first voltage dividing means and having a center connection and having the ends connected in common and being connected to the second transducer means to establish a pair of similar voltage drops in accordance with the unbalance effects in the second sensing plane, a movable connection in the second voltage dividing means constituting one output connection and said common connected ends constituting a second output connection, means interconnecting the movable connections of the first and second voltage dividing means to establish corresponding positioning of the movable connections, and means electrically connecting the second outputs of the first and second voltage dividing means.

4. In a plane separating circuit for individually determining the unbalance components in a plurality of transverse planes of a rotating body by establishing a pair of A.C. voltages in accordance with unbalance effects in two axially spaced sensing planes, first potentiometer means connected to one of said A.C. voltages to establish a voltage drop in accordance with the unbalance in one sensing plane, a center connection to said potentiometer means constituting an output connection and establishing a pair of similar voltages of opposite polarity, a movable connection connected in the potentiometer means for selection of a voltage of either polarity and constituting a second output connection, a second potentiometer means connected to the other of said A.C. voltages, said second potentiometer means having the opposite ends connected in common and constituting an input connection and an output connection and having a ceter tap constituting a second input connection to establish corresponding voltage drops between the center tap and the common connected ends, a movable connection in said second potentiometer means constituting a second output connection for selection of a corresponding voltage to either side of the center tap, means interconnecting said movable connections to establish corresponding positioning on the respective voltage dividing means, a voltage summation circuit serially including the outputs of the first and second potentiometer means to algebraically sum up the voltage drops, and a detector connected in the voltage summation circuit to indicate the unbalance components.

5. In a plane separating network including a pair of similar plane separating circuits for individually determining the unbalance components in a plurality of transverse planes in a rotating body by establishing two A.C. voltages in accordance with unbalance effects in two axially spaced sensing planes, each of said plane separating circuits including a first potentiometer means connected to one of said A.C. voltages to establish a voltage drop in accordance with the balance effects in one sensing plane, a center connection to said potentiometer means constituting an output connection and having a pair of similar voltages of opposite polarity one on each side thereof, a movable connection operatively connected in the potentiometer means for selection of a voltage of either polarity and constituting a second output connection, a second potentiometer means connected to the other of said A.C. voltages, said second potentiometer means having the opposite ends connected in common and constituting an input connection and an output connection and having a center tap constituting a second input connection to establish corresponding voltage drops between the center tap and the common connected ends, a movable connection in said second potentiometer means constituting a second output connection, a voltage summation circuit serially including the outputs of the first and second potentiometer means to algebraically sum up the voltage drops, means connecting the movable connections of the potentiometer means to correspondingly position the connections, a detector connected in the voltage summation circuit to indicate the unbalance components, and interconnected switch means adapted to selectively connect each of said similar plane separating circuits to said A.C. voltages and to said detector.

6. In a plane separating circuit for individually determining the unbalance components in a plurality of transverse planes of a rotating body by establishing a pair of A.C. voltages in accordance with unbalance effects in two axially spaced sensing planes, first potentiometer means connected to one of said A.C. voltages to establish a voltage drop in accordance with the unbalance effect in one sensing plane a center connection to said potentiometer means constituting an output connection and having a pair of similar voltages of opposite polarity one on each side thereof, a movable connection operatively connected in the potentiometer means for selection of a voltage of either polarity and constituting a second output connection, a second potentiometer means connected to the other of said A.C. voltages, said second potentiometer means having opposite ends connected in common and constituting an input connection and an output connection and having a center tap constituting an input connection establishing corresponding voltage drops between the center tap and the common connected ends, a movable connection operatively connected in said second potentiometer means constituting an output connection, means to connect the movable connections of the first and second potentiometer means for simultaneous and similar positioning of the movable connections, the outputs of the first and second potentiometer means being connected in a series summation circuit to algebraically sum up the voltage drops, a calibrating potentiometer means connected across the summation circuit, said calibrating potentiometer means having a center tap and a movable connection constituting output connections of said calibrating potentiometer, and a detector connected to the output connections of the calibrating potentiometer.

References Cited in the file of this patent

UNITED STATES PATENTS

| | | |
|---|---|---|
| 2,243,379 | Johnson | May 27, 1941 |
| 2,322,561 | Bevins et al. | June 22, 1943 |
| 2,331,733 | Senger | Oct. 12, 1943 |
| 2,461,645 | Kallman | Feb. 15, 1949 |
| 2,731,834 | Fehr et al. | Jan. 24, 1956 |
| 2,805,576 | Rambo | Sept. 10, 1957 |
| 2,815,666 | Pischel | Dec. 10, 1957 |
| 2,851,885 | Federn | Sept. 16, 1958 |
| 2,861,455 | Wright | Nov. 25, 1958 |
| 2,962,899 | Weisse et al. | Dec. 6, 1960 |
| 2,980,331 | Gruber et al. | Apr. 18, 1961 |

UNITED STATES PATENT OFFICE

CERTIFICATE OF CORRECTION

Patent No. 3,116,643

January 7, 1964

Norman C. Sethne

It is hereby certified that error appears in the above numbered patent requiring correction and that the said Letters Patent should read as corrected below.

Column 9, line 67, for "raidly" read -- rapidly --; column 12, line 56, after "plane" insert a comma.

Signed and sealed this 9th day of June 1964.

(SEAL)
Attest:

ERNEST W. SWIDER
Attesting Officer

EDWARD J. BRENNER
Commissioner of Patents